(12) United States Patent
Farina

(10) Patent No.: US 11,674,976 B2
(45) Date of Patent: Jun. 13, 2023

(54) SCANNING PROBE MICROSCOPE WITH A SAMPLE HOLDER FED WITH ELECTROMAGNETIC WAVE SIGNALS

(71) Applicant: ALCATERA LLC

(72) Inventor: Marco Farina, Ancona (IT)

(73) Assignee: ALCATERA INC., Los Angeles, CA (US)

( * ) Notice: Subject to any disclaimer, the term of this patent is extended or adjusted under 35 U.S.C. 154(b) by 61 days.

(21) Appl. No.: 17/413,662

(22) PCT Filed: Dec. 13, 2019

(86) PCT No.: PCT/US2019/066124
§ 371 (c)(1),
(2) Date: Jun. 14, 2021

(87) PCT Pub. No.: WO2020/123891
PCT Pub. Date: Jun. 18, 2020

(65) Prior Publication Data
US 2022/0074968 A1 Mar. 10, 2022

Related U.S. Application Data

(60) Provisional application No. 62/779,543, filed on Dec. 14, 2018.

(51) Int. Cl.
*G01Q 30/20* (2010.01)
*G01Q 30/02* (2010.01)

(52) U.S. Cl.
CPC .......... *G01Q 30/20* (2013.01); *G01Q 30/02* (2013.01)

(58) Field of Classification Search
CPC ................ G01Q 30/20; G01Q 30/02
USPC ............. 850/9; 250/440.11, 441.11, 442.11, 250/443.1
See application file for complete search history.

(56) References Cited

U.S. PATENT DOCUMENTS

| | | |
|---|---|---|
| 2002/0171038 A1 | 11/2002 | Nakagawa |
| 2008/0129316 A1 | 6/2008 | Zoughi |
| 2008/0265919 A1 | 10/2008 | Izadian |
| 2016/0098913 A1* | 4/2016 | Vastmans ........... G01M 11/3154 356/73.1 |

(Continued)

FOREIGN PATENT DOCUMENTS

CN 203825035 U 9/2014

OTHER PUBLICATIONS

Pedreno-Molina, J. et al.; "Design and Validation of a Ten-Port Waveguide Reflectometer Sensor: Application to Efficiency Measurement and Optimization of Microwave-Heating Ovens" Sensors, Issue 8, vol. 12; Dec. 3, 2008.

*Primary Examiner* — Nicole M Ippolito
(74) *Attorney, Agent, or Firm* — Dickinson Wright PLLC; Andrew D. Dorisio

(57) ABSTRACT

A scanning probe microscope including a holder having at least one electric port, wherein the holder is configured to support a sample to be imaged. The scanning probe microscope further includes a probe and an actuator configured to move at least one of the holder and the probe up to three directions. The scanning probe microscope further includes a reflectometer configured to measure reflection and/or transmission coefficients at each of the at least one electric ports of the holder by feeding each of the at least one electric ports of the holder with electromagnetic wave signals.

19 Claims, 1 Drawing Sheet

(56) References Cited

U.S. PATENT DOCUMENTS

2018/0088308 A1* 3/2018 Liu ..................... G02B 21/367

* cited by examiner

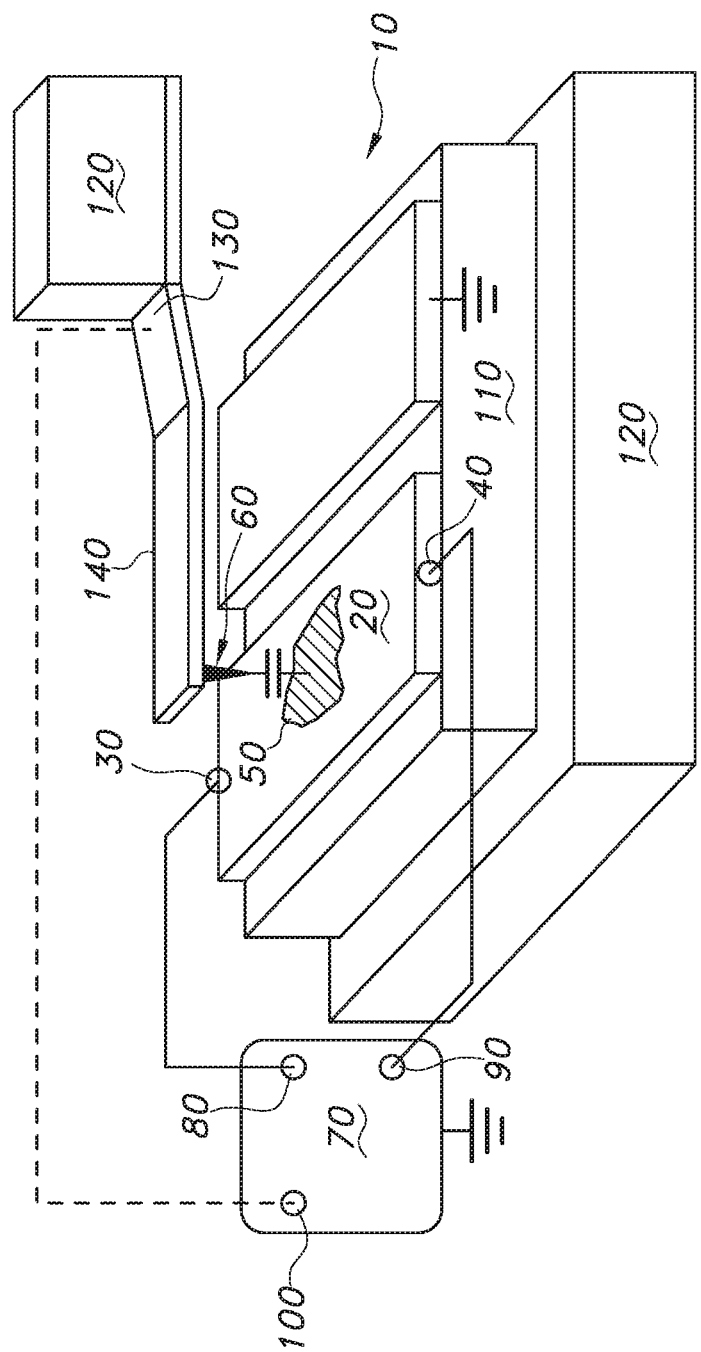

SCANNING PROBE MICROSCOPE WITH A SAMPLE HOLDER FED WITH ELECTROMAGNETIC WAVE SIGNALS

This application claims the benefit of U.S. Provisional Patent Application Ser. No. 62/779,543, filed on Dec. 14, 2018, the disclosure of which is incorporated herein by reference.

TECHNICAL FIELD

This disclosure relates generally to microwave microscopy and, more particularly, to scanning probe microscopes with a sample holder having at least one electric port fed with electromagnetic wave signals.

BACKGROUND

A Scanning Microwave Microscope (SMM) is a kind of scanning probe microscope. A representative SMM is described in U.S. Pat. No. 5,821,410, the disclosure of which is incorporated herein by reference.

SMM is a known sub-diffraction technique that has proven to provide high resolution/atomic-scale images and measurements of local electromagnetic properties of samples, enabling sub-surface probe of matter. Nonetheless it requires specially designed and expensive electronics, incompatible with salty liquid and consequently with biological living samples. The existing commercial SMMs generally use an Atomic Force Microscope (AFM) where the head is modified to host the specially designed tip. The AFM takes care of controlling the tip-sample interaction, while a Vector Network Analyzer (VNA) injects microwave signals to the probe and measures the reflected signal. Provided that a calibration procedure is available, the local sample impedance can be deduced from the reflection coefficient. Owing to the difficulty in getting accurate shielding, parasitic capacitances between probe, substrate and microscope enhance a specific SMM artifact, the "topography cross-talk", where topographic details appear in the microwave image. In fact, the microwave probe detects the displacement of the piezoelectric actuator of the AFM. Such effect is reduced when replacing the AFM by a Scanning Tunneling Microscope (STM). However, a STM is challenging to probe soft matter, poorly conductive materials and materials in liquid, that are very common in bio applications. In addition, the above systems are not very accurate due to impedance mismatch between the VNA and the sample load, therefore expedients are generally used, such as adding a resonator with a shunt 50-Ohm resistor or using an interferometric setup. In both cases, the resulting measurement is based on resonance, hence single frequency (or discrete set of frequencies) measurements, and the lossy shunt resistor in one of the solutions wastes part of the informative signal. As matter of fact, this mismatch cannot be avoided, since the sample will be almost always highly reflective. If the sample is lossless, all microwave signals would be reflected making the impedance matching impossible.

SUMMARY

In accordance with one aspect of the disclosure, a scanning probe microscope is disclosed. The scanning probe microscope includes a holder having at least one electric port. The holder is configured to support a sample to be imaged. The scanning probe microscope further includes a probe. The scanning probe microscope also includes an actuator configured to move at least one of the holder and the probe up to three directions. The scanning probe microscope further includes a reflectometer configured to measure reflection and/or transmission coefficients at each of the at least one electric ports of the holder by feeding each of the at least one electric ports of the holder with electromagnetic wave signals.

In one embodiment, the probe is made of or coated by an electrically conducting or semiconducting material. The probe may be configured to influence the reflection and/or transmission coefficients according to a position in relation to the sample to be imaged. The probe may be configured to be left open, grounded, connected/coupled to a fixed potential, connected/coupled to a matching circuit, or connected/coupled to a port of an instrument when the microscope is in use. The scanning probe microscope may also include at least one matching circuit in a particular impedance.

In another embodiment, the reflectometer includes at least one corresponding port. A first corresponding port of the reflectometer is electrically connected or coupled to a first port of the holder. A second corresponding port of the reflectometer is electrically connected or coupled to a second port of the holder. An auxiliary port of the reflectometer is electrically connected or coupled to the probe.

In yet another embodiment, the actuator comprises a piezo actuator. The reflectometer comprises a planar or non-planar waveguide with at least one corresponding electric port. The waveguide may be a transmission line, such as a microstrip, a coplanar waveguide or a slotline. The waveguide may also be a hollow or dielectric-filled conductive pipe, a dielectric pipe or rod, or an electromagnetic wave fiber. The holder may be a resonant tank, a directional coupler, a power combiner, a power splitter, an electromagnetic wave circulator, or an electromagnetic wave transformer. The holder comprises a lumped passive circuit with or without at least one excitation active circuit. The holder may also comprise an LC or RC resonator. The reflectometer may be one of a Vector Network Analyzer (VAN), an interferometer or a combination of an electromagnetic wave generator, a directional coupler and an electromagnetic wave detector.

In still another embodiment, the electromagnetic wave signals have a frequency in the range from 100 MHz to 10 THz or in one or more of a first sub-range from 100 MHz to 1 GHz and a second sub-range from 1 GHz to 10 GHz and a third sub-range from 10 GHz to 100 GHz and a fourth sub-range from 100 GHz to 1 THz and a fifth sub-range from 1 THz to 10 THz. The frequency of said electromagnetic wave signals is continuously varied during use of the microscope, such as within a sub-range.

In still yet another embodiment, the transmission line comprises a substrate and at least one stripes and/or one or more patterns, the stripes and/or patterns being on and/or in the substrate. The substrate may be made of an electrically insulating material, such as glass, quartz, alumina, FR4, PTFE, ceramic or epoxy. Any of the stripes and/or patterns may be made of an electrically conductive material, such as copper, aluminum, silver or gold. Any of the stripes and/or patterns may also have a coating preferably made of gold. Any of the stripes and/or patterns may also have a sheath of electrically insulating material. The substrate may have a first side and a second side, the first side being arranged to be in contact with the sample. Any of the stripes and/or patterns may be located on a same side of the substrate, preferably the first side of the substrate.

In an additional embodiment, the holder includes discrete electric and/or electronic components placed on a substrate, wherein the discrete electric components may be implemented as one or more stripes and/or one or more patterns, the stripes and/or patterns being on and/or in the substrate. The substrate may be made of an electrically insulating material, such as glass, quartz, alumina, FR4, PTFE, ceramic or epoxy. Any of the stripes and/or patterns may be made of an electrically conductive material, such as copper, aluminum, silver or gold. Any of the stripes and/or patterns may also have a coating preferably made of gold and/or a sheath of electrically insulating material. The substrate may have a first side and a second side, the first side being arranged to be in contact with the sample. Any of the stripes and/or patterns may be located on a same side of the substrate, preferably the first side of the substrate.

In yet another embodiment, the excitation active circuit comprises an amplifier and/or a mixer and/or an oscillator and/or a detector and/or a frequency divider and/or a frequency multiplier and/or a phase detector and/or a phase shifter and/or a microwave switch and/or an active filter, including discrete electric and/or electronic components and/or integrate circuits. Additionally, the scanning probe microscope may be integrated with an Atomic Force Microscope, a Scanning Tunneling Microscope, an Electrostatic Force Microscopy or a Scanning Near-field Optical Microscope.

In yet another aspect of the disclosure, a sample holder for a scanning probe microscope is disclosed. The sample holder includes a device with one or more electric ports. The device is arranged to support a sample to be imaged. Each of the one or more electric ports of the device is arranged to be fed by electromagnetic wave signals.

In one embodiment, the device is a planar or non-planar waveguide with one or more corresponding electric ports. The waveguide may be a transmission line, such as a microstrip, a coplanar waveguide or a slotline. The waveguide may also be a hollow or dielectric-filled conductive pipe, a dielectric pipe or rod, or an electromagnetic wave fiber, and/or the device may be a resonant tank, a directional coupler, a power combiner, a power splitter, an electromagnetic wave circulator, or an electromagnetic wave transformer. The device may also be a lumped passive circuit with or without one or more excitation active circuits or the device may comprise an LC or RC resonator.

In yet another embodiment, the transmission line comprises a substrate and one or more stripes and/or one or more patterns, the stripes and/or patterns being on and/or in the substrate. The substrate may be made of an electrically insulating material, such as glass, quartz, alumina. FR4, PTFE, ceramic or epoxy. Any of the stripes and/or patterns may be made of an electrically conductive material, such as copper, aluminum, silver or gold. Any of the stripes and/or patterns may also have a coating preferably made of gold. Any of the stripes and/or patterns may have a sheath of electrically insulating material. The substrate may have a first side and a second side, the first side being arranged to be in contact with said sample. Any of the stripes and/or patterns may be located on a same side of the substrate, preferably the first side of the substrate.

In still yet another embodiment, the device includes discrete electric and/or electronic components placed on a substrate, wherein the discrete electric and/or electronic components may be implemented as one or more stripes and/or one or more patterns, the stripes and/or patterns being on and/or in the substrate. The substrate may be made of an electrically insulating material, such as glass, quartz, alumina. FR4, PTFE, ceramic or epoxy. Any of the stripes and/or patterns is made of an electrically conductive material, such as copper, aluminum, silver or gold. Any of the stripes and/or patterns may also have a coating preferably made of gold. Any of the stripes and/or patterns may have a sheath of electrically insulating material. The substrate may have a first side and a second side, the first side being arranged to be in contact with said sample. Any of the stripes and/or patterns may be located on a same side of the substrate, preferably the first side of the substrate.

BRIEF DESCRIPTION OF THE DRAWINGS

The accompanying drawing incorporated in and forming a part of the specification, illustrates several aspects of this disclosure, and together with the description serve to explain the principles of the disclosure. In the drawing:

FIG. 1 is a schematic view of a SMM forming one aspect of this disclosure.

DETAILED DESCRIPTION

In the following detailed description, reference is made to the accompanying drawing that forms a part hereof, and in which is shown by way of illustration, specific embodiments in which the invention may be practiced. These embodiments are described in sufficient detail to enable those skilled in the art to practice the embodiments and like numerals represent like details in the various figures. Also, it is to be understood that other embodiments may be utilized and that process or other changes may be made without departing from the scope of the disclosure. The following detailed description is not to be taken in a limiting sense, and the scope of the invention is defined only by the appended claims and their equivalents. In accordance with the disclosure, a scanning probe microscope is hereinafter described.

With reference to FIG. 1, a scanning probe microscope 10 is illustrated. The microscope includes a holder 20 having one or more electric ports 30, 40 arranged to support a sample 50 to be imaged. The microscope also includes a probe 60, which is preferably made of or coated by an electrically conducting or semiconducting material. The microscope further includes an actuator 120, which is arranged or configured to move the holder and/or the probe according to one, two or three directions. The actuator 120 may be a piezo actuator. The microscope also includes a setup, such as a reflectometer 70, which is arranged or configured to measure reflection and/or transmission coefficients at each of the one or more electric ports of the holder by feeding each of the ports with electromagnetic wave signals, such as microwave signals. It is noted that "electrically conducting material" means a material having an electrical conductivity of at least 100,000 S/m, even if lower conductivities may also be considered.

The probe 60 may be configured to influence the reflection and/or transmission coefficients according to a position in relation to the sample 50 to be imaged. The probe may be configured to be left open, grounded, connected/coupled to a fixed potential, connected/coupled to a matching circuit, or connected/coupled to a port of an instrument when the microscope is in use. The scanning probe microscope 10 may also include at least one matching circuit in a particular impedance.

The reflectometer 70 includes at least one port 80, 90 corresponding to the at least one electric port 30, 40 of the holder 20. A first corresponding port 80 of the reflectometer 70 is electrically connected or coupled to a first port 30 of the holder 20, such as a first end of a waveguide. A second corresponding port 90 of the reflectometer 70 is electrically connected or coupled to a second port 40 of the holder 20, such as a second end of the waveguide. An auxiliary port 100 of the reflectometer 70 may also be electrically connected or coupled to the probe 60.

The reflectometer 70 includes a planar or non-planar waveguide with at least one corresponding electric port. The waveguide may be a transmission line, such as a microstrip, a coplanar waveguide or a slotline. The waveguide may also be a hollow or dielectric-filled conductive pipe, a dielectric pipe or rod, or an electromagnetic wave fiber. The holder may be a resonant tank, a directional coupler, a power combiner, a power splitter, an electromagnetic wave circulator, or an electromagnetic wave transformer. The holder may include a lumped passive circuit with or without at least one excitation active circuit. The holder may also include an LC or RC resonator. The reflectometer may be one of a Vector Network Analyzer (VAN) (as shown in FIG. 1), an interferometer or a combination of an electromagnetic wave generator, a directional coupler and an electromagnetic wave detector.

The electromagnetic wave signals have a frequency in the range from 100 MegaHertz (MHz) to 10 TeraHertz (THz) or in one or more of a first sub-range from 100 MHz to 1 GigaHertz (GHz) and a second sub-range from 1 GHz to 10 GHz and a third sub-range from 10 GHz to 100 GHz and a fourth sub-range from 100 GHz to 1 THz and a fifth sub-range from 1 THz to 10 THz. The frequency of the electromagnetic wave signals is continuously varied during use of the microscope, such as within a sub-range.

The transmission line comprises a substrate 110 and at least one stripes and/or one or more patterns. The stripes and/or patterns are on and/or in the substrate 110. The substrate 110 may be made of an electrically insulating material, such as glass, quartz, alumina, FR4, PTFE, ceramic or epoxy. Any of the stripes and/or patterns may be made of an electrically conductive material, such as copper, aluminum, silver or gold. Any of the stripes and/or patterns may also have a coating preferably made of gold. Any of the stripes and/or patterns may also have a sheath of electrically insulating material. The substrate may have a first side and a second side. The first side is arranged to be in contact with the sample. Any of the stripes and/or patterns may be located on a same side of the substrate, preferably the first side of the substrate. In addition, the holder 20 may include discrete electric and/or electronic components placed on a substrate 110, wherein the discrete electric components may be implemented as one or more stripes and/or one or more patterns, the stripes and/or patterns being on and/or in the substrate.

Turning back to the holder 20, the excitation active circuit may include an amplifier and/or a mixer and/or an oscillator and/or a detector and/or a frequency divider and/or a frequency multiplier and/or a phase detector and/or a phase shifter and/or a microwave switch and/or an active filter, including discrete electric and/or electronic components and/or integrate circuits. Additionally, the scanning probe microscope 10 may be integrated with an Atomic Force Microscope, a Scanning Tunneling Microscope, an Electrostatic Force Microscopy or a Scanning Near-field Optical Microscope.

It should be appreciated that an "inverted scanning microwave microscope" or "iSMM" disclosed herein (and further described in "Inverted Scanning Microwave Microscope for In Vitro Imaging and Characterization of Biological Cells") allows any existing scanning probe microscope to be easily converted into a SMM compatible with liquid environment without above mentioned problems.

In a conventional AFM-SMM system, a microwave signal is fed to the probe to measure the reflection coefficient of the sample placed or deposited on a conductive substrate sample holder. In contrast, the present invention relates to a microwave signal being fed to one or two or more ports of the sample holder, while the probe can be left open or grounded or connected/coupled to a fixed potential or connected/coupled to a matching circuit or even connected/coupled to a port of an instrument. In its simpler implementation, such a port is grounded, so that no specific electrical connection to the probe would be needed, apart from requiring the probe to be metallic and AC-coupled to any ground, such as the metal head of an AFM or an STM. In such setup, any probe made of or coated by electrically conducting or semiconducting material would work, so that any scanning probe microscope having e.g. a metallic tip can be used.

A first important advantage is that any Scanning Probe Microscope (SPM), such as a AFM, STM, EFM, SNOM, etc. may be upgraded to a SPM+SMM by using a waveguide (in particular a transmission line) or non-waveguide based sample holder, as proposed herein, without even modifying the original probe. When using a waveguide-based sample holder, practical implementations may differ and can be for example a microstrip, as well as a coplanar waveguide or a slot-line. The sample is deposited preferably on the signal line; for example, in case of cells, they may be directly placed or grown on the whole transmission line. Since the microwave signal is applied across the transmission line, the measurements can be either in reflection (e.g. S11, the scattering parameter at port 1) or in transmission coefficient (e.g. S21). The sample holder can be designed based on e.g. any transmission line, where the ground conductor is either on the same plane as the signal line or on the back side of substrate. The ground line of transmission line is preferably connected directly to the ground of a VNA (or other type of reflectometer), whereas the signal line of the transmission line can be either directly connected to the signal pin of connector throughout cable to a VNA (or other type of reflectometer), or by an air gap in between creating e.g. a capacitive coupling. During scan, the sample is preferably put directly over the signal line. The probe may scan the sample as usual. The incident and reflected signals can be sensed and measured by a VNA (or other type of reflectometer) through one or more of its ports.

It should be appreciated that the VNA 70 shown in FIG. 1 may be replaced by another type of reflectometer and that the probe interface 130 may be left open or grounded or connected/coupled to a fixed potential or connected/coupled to a matching circuit or even connected/coupled to a port of an instrument e.g. an auxiliary probe of the same VNA, and that the optional cantilever 140 may assist in moving the probe over the sample.

The possible applications of the herein disclosed SMMs include:

1. non-invasive label-free characterization of living cells, bacteria, viruses and organelles
2. semiconductor process quality control
3. 2D/thin-film material characterization
4. tomography in metals for detection of defects
5. battery and fuel-cell in-liquid characterization The SMM disclosed herein offers several advantages over traditional SMMs, such as flexibility. By exchanging a traditional sample holder of a traditional SPM with the present electromagnetic-stimulation sample holder (and appropriately connecting to a measuring equipment), a traditional SPM may be upgraded to a SPM+SMM as herein disclosed with unprecedented capability of broadband microwave characterization of any sample, with comparable or even better sensitivity and signal-to-noise ratio.

In addition, by adopting e.g. a slot-line or any planar configuration (of some herein disclosed SMMs), a good portion of the grounded body of the cantilever during scan can be exposed to the ground conductor, mitigating the cross-talk effect which is recognized to be a serious problem when quantifying the results of any traditional SMM.

Furthermore, the SMM disclosed herein is capable of being a broadband SMM which is very unique. The present electromagnetic-stimulation sample holder (for example the planar transmission line-based sample holder) can be matched over a very broad band offering higher sensitivity at higher frequency, which is advisable for any kind of spectroscopy. On the contrary, a traditional SMM cannot be matched since it terminates a transmission line with a probe which is mostly a capacitive load.

Importantly, the reflection and transmission mode measurements can be performed at the same time. This is important because, for example, a VNA can usually achieve 120-130 dB dynamic range amazingly in transmission mode but limited dynamic range, typically 40-60 dB, in reflection mode due to VNA's incapability of discriminating the two travelling directions of waves. The two-port capability (of some herein disclosed SMMs) provide completely new windows to sensitive nanoscale microwave characterization.

Advantageously, the three-port capability of the SMM derives from using the probe connected to a port of an instrument, for example an auxiliary port of a VNA. This provides an extra freedom degree in microwave characterization. Use of independent ports allows to improve the robustness of material characterization.

The foregoing descriptions of various embodiments have been presented for purposes of illustration and description. These descriptions are not intended to be exhaustive or to limit the invention to the precise forms disclosed. The embodiments described provide the best illustration of the inventive principles and their practical applications to thereby enable one of ordinary skill in the art to utilize the disclosure in various embodiments and with various modifications as are suited to the particular use contemplated.

The invention claimed is:

1. A scanning probe microscope comprising:
    a holder having at least one electric port, said holder configured to support a sample to be imaged;
    a probe;
    an actuator configured to move at least one of the holder and the probe up to three directions; and
    a reflectometer configured to measure reflection or transmission coefficients at each of the at least one electric ports of said holder by feeding each of the at least one electric ports of said holder with electromagnetic wave signals.

2. The scanning probe microscope of claim 1, wherein said probe is made of or coated by an electrically conducting or semiconducting material.

3. The scanning probe microscope of claim 1, further comprising at least one matching circuit in a particular impedance.

4. The scanning probe microscope of claim 1, wherein a first corresponding port of said reflectometer is electrically connected or coupled to a first port of said holder.

5. The scanning probe microscope of claim 4, wherein a second corresponding port of said reflectometer is electrically connected or coupled to a second port of said holder.

6. The scanning probe microscope of claim 4, wherein an auxiliary port of said reflectometer is electrically connected or coupled to said probe.

7. The scanning probe microscope of claim 1, wherein said actuator comprises a piezo actuator.

8. The scanning probe microscope of claim 1, wherein said reflectometer comprises a planar or non-planar waveguide with at least one corresponding electric port.

9. The scanning probe microscope of claim 8, wherein said waveguide is a transmission line, such as a microstrip, a coplanar waveguide or a slotline.

10. The scanning probe microscope of claim 9, wherein said transmission line comprises a substrate and at least one stripes or one or more patterns, the stripes or patterns being on or in the substrate.

11. The scanning probe microscope of claim 10, wherein said substrate is made of an electrically insulating material selected from the group consisting of glass, quartz, alumina, FR4, PTFE, ceramic and epoxy.

12. The scanning probe microscope of claim 10, wherein any of said stripes or patterns is made of an electrically conductive material, selected from the group consisting of copper, aluminum, silver and gold.

13. The scanning probe microscope of claim 12, wherein any of said stripes or patterns has a coating made of gold.

14. The scanning probe microscope of claim 12, wherein any of said stripes or patterns has a sheath of electrically insulating material.

15. The scanning probe microscope of claim 10, wherein said substrate has a first side and a second side, said first side being arranged to be in contact with said sample.

16. The scanning probe microscope of claim 10, wherein any of said stripes or patterns is located on a same side of the substrate.

17. The scanning probe microscope of claim 8, wherein said waveguide is a hollow or dielectric-filled conductive pipe, a dielectric pipe or rod, or an electromagnetic wave fiber.

18. The scanning probe microscope of claim 17, wherein said holder is a resonant tank, a directional coupler, a power combiner, a power splitter, an electromagnetic wave circulator, or an electromagnetic wave transformer.

19. The scanning probe microscope of claim 1, wherein said holder comprises a lumped passive circuit with or without at least one excitation active circuit.

* * * * *